United States Patent Office 3,292,477
Patented Dec. 20, 1966

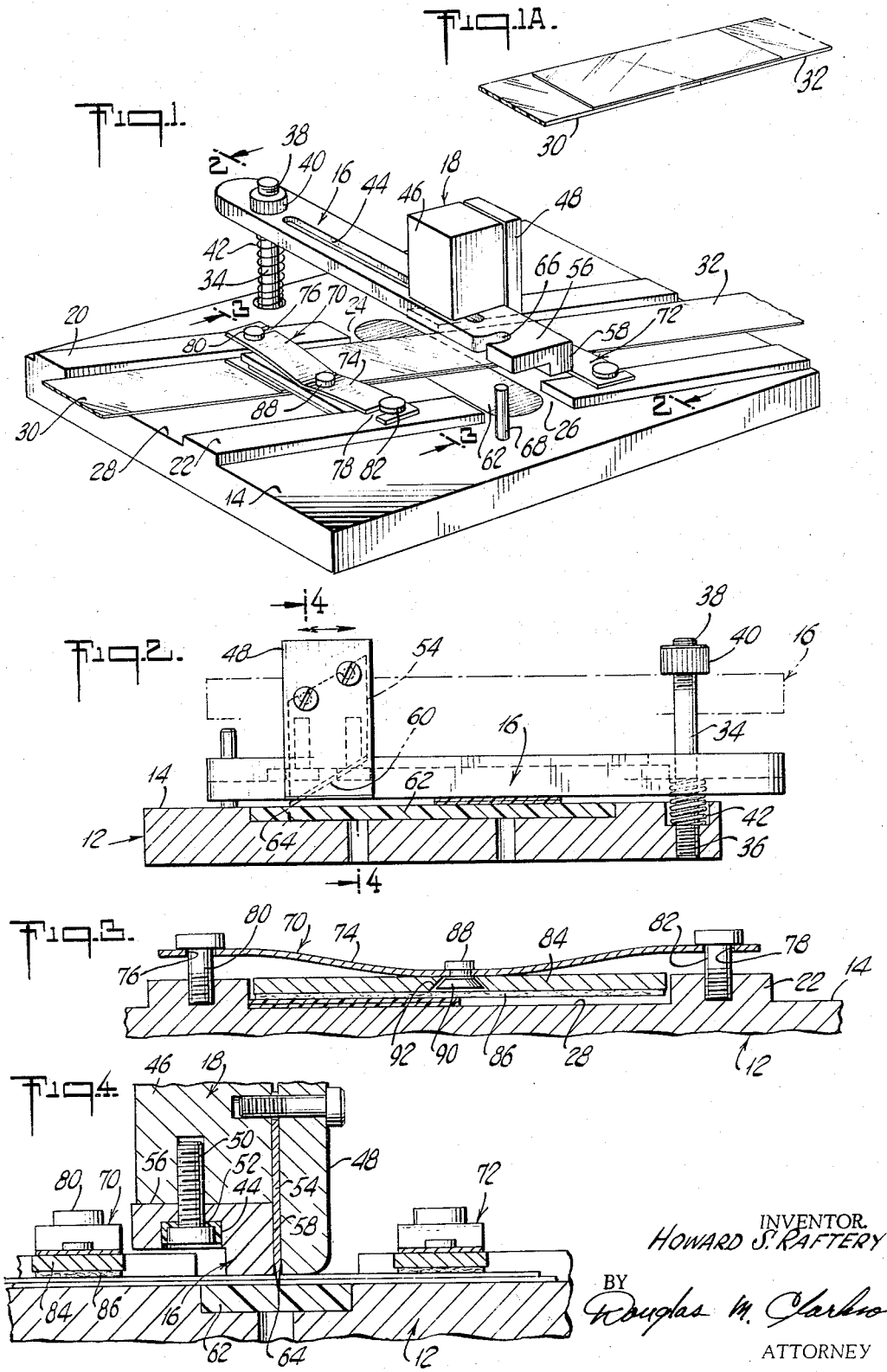

3,292,477
TAPE SPLICER
Howard S. Raftery, Massapequa, N.Y., assignor to Potter Instrument Company, Inc., Plainview, N.Y., a corporation of New York
Filed Feb. 19, 1965, Ser. No. 434,083
3 Claims. (Cl. 83—464)

This invention, generally, relates to a tape splicing mechanism, and, more particularly, to a splicing mechanism for use with data processing magnetic tape.

For magnetic and other types of tape, it is customary to make a tape splice by overlapping the broken ends and, then, cutting the ends so that they can be juxtaposed. A splicing strip having an adhesive surface is prepared by removing a backing strip to expose the adhesive, and the strip then is pressed against the evenly cut tape ends to hold them together.

During testing of prototype magnetic tape machines the tape frequently will break. In splicing the tape, it is necessary to form the splice with edges of the tape aligned exactly. If the tape is spliced unevenly, an uneven edge will result in loss of several bits of information.

In addition, it is necessary to form the splice with a smooth surface, since any bumps in the tape will be picked up during recording and playback causing erroneous signals to be generated. For instance, cutting the tape by pressing a knife edge down across the top of the tape may cause a surface unevenness that would result in such a pick up.

Accordingly, it is an object of the invention to provide a tape splicing mechanism which will firmly hold the tape ends in proper positions with edges exactly aligned, which will achieve cutting of the tape ends in a manner to avoid surface unevenness, and which will permit cutting the tape ends and application of a splicing strip without the tape moving. A primary consideration is that splicing be effected in as rapid and facile a manner as possible.

In accordance with the objects of the invention, there is provided a tape splicer having in combination a base with an upper surface. Raised guides are positioned on the base for guiding a tape extending across the upper surface, the guides being interrupted at a point intermediate ends thereof, and the upper surface being flat adjacent the guides to receive the tape. An elongated cutting arm is supported pivotally on the base, preferably at one end by a shaft extending upwardly from the base in the area of said intermediate point. The arm thus is pivotable away from the tape receiving surface to permit clamping and splicing of the tape ends on the surface, and the arm is pivotable into a predetermined position across the tape ends for the cutting operation.

Supported by the arm and adapted for movement longitudinally along the arm is a cutter having a knife edge. Preferably, when the cutting arm is positioned appropriately, the knife edge makes an oblique cut across the tape ends. In this respect, the tape guides may be arranged to extend obliquely across the base upper surface so that the knife edge can be moved appropriately towards or away from the operator to make the oblique cut.

Embedded in the base along the cutting path is a material softer than the knife edge. The knife edge is inclined relative to the base upper surface and is adapted to extend a short distance into the embedded material at its trailing edge so that a scissor type of cut will be made on the overlapping tape ends in drawing the knife across the tape ends. By interrupting the guides or providing a space between the guides in the area of the knife path, interference in this respect is avoided.

Clamping means are provided on opposite sides of the knife path to hold the tape ends firmly in position during the cutting and splicing operation. With respect to the latter, the cutting arm is readily moved away from the tape to permit application of the splicing strip.

The above and other objects and advantages of the invention will become more apparent upon consideration of the following specification with reference to the accompanying drawings, in which:

FIG. 1 is a perspective view of a tape splicing mechanism in accordance with the invention;

FIG. 1A is a perspective view showing spliced tape ends;

FIG. 2 is a section view on an enlarged scale taken along line 2—2 of FIG. 1;

FIG. 3 is a section view on an enlarged scale, taken along line 3—3 of FIG. 1, illustrating a clamp in accordance with the invention; and FIG. 4 is a section view taken along line 4—4 of FIG. 2.

Referring to the drawings, FIG. 1 shows a splicer having a base 12, a flat upper surface 14, and an elongated cutting arm 16, the latter supporting a cutter or cutting block 18 engaged by the cutting arm for longitudinal movement along the arm. On the base upper surface 14, extending diagonally or obliquely across the surface, are parallel spaced apart raised guides 20 and 22, the surface between the parallel guides having a width sufficient to readily accommodate the width of a tape to be spliced. The guides are not continuous, being interrupted at points 24 and 26 intermediate the guide ends. The guides also are raised above the upper surface of the base a height preferably greater than but at least equal to the thickness of the tape. Between the guides, the area 28 is straight and flat to receive the tape ends 30 and 32.

Approximately aligned with the points at which the guides are interrupted is a shaft or spindle 34 extending perpendicularly upward from the base upper surface providing a pivot point for the arm 16. As shown in FIG. 2, the shaft 34 is threaded at its ends and is turned at one end 36 into the base 12, and at the other end 38, is capped with a nut 40. The arm 16 is retained on the shaft by the locking nut 40 and is urged upwardly against the nut by a coil spring 42 extending between the base upper surface and the arm.

The arm 16 is an elongated member having a length substantially equal to the width of the base, and is provided with an elongated slot 44 extending axially along the arm. The cutting block 18, which consists of a body portion 46 and a clamping member 48, secured against a face of the body portion, is provided with a downwardly extending bolt 50 (FIG. 4) arranged to engage the slot 44 of the cutting arm.

Along the underside of the slot, there is provided a Teflon (polyesterfluoroethylene) sleeve 52 against which the bolt 50 seats for easier sliding of the cutting block on the arm. A flat knife edge or cutter blade 54 is held between the body 46 and clamping member 48, the body and clamping member being arranged to hold the blade upright relative to the base upper surface, and in a plane parallel to the path of movement of the cutting block.

For providing the desired sliding surface for the cutting block, the arm 16 has an upper face 56 and a front face 58 against which the knife 54 slides during a cutting operation.

When the arm is properly positioned, the path of movement of the knife 54 will be across the tape in a direction towards or away from the operator, depending on where the operator is standing, and between the points 26 and 24 where the tape guides 20 and 22 are interrupted. Preferably the position of the arm is oblique relative to the tape ends 30 and 32 permitting an oblique cut across the tape ends. FIG. 1A shows a tape splice with the desired oblique cut which provides a stronger joint than that obtained with a straight cross cut.

Referring to FIG. 2, the knife 54 is provided with a cutting edge 60 which is inclined relative to the base upper surface 14. Embedded in the base upper surface along the path of movement for the knife, is a strip of material 62, such as a plastic, which is softer than the composition of the knife. For instance, a copper base alloy or brass may be used also. The knife therefore can be positioned by the clamp 48 of the cutting block so that, when the cutting arm is in cutting position, a trailing portion 64 of the knife edge bears into the base embedded material 62. This achieves a scissor like cut when the knife is advanced across the tape ends.

Such a cut avoids surface bumps or irregularities which will be picked up during recording and playback. By interrupting the guides 20 and 22 in the area of the cutting path, interference by the guides with execution of the cut is avoided.

At the end of the arm removed from the pivot shaft 34, a slot 66 is provided on the rear side of the arm facing in a direction opposite to the front face 58. This slot 66, when the arm is pivoted across the tape and is pressed downwardly compressing the spring 42, engages a locating pin 68 appropriately disposed on the base relative to the shaft 34 to position the cutting arm accurately for cutting the tape ends. Thus, when the arm is in its depressed position and the slot and locating pin are in operative engagement, the desired cut across the tape can be made.

On opposite sides of the cutting area are clamps 70 and 72 (FIGS. 1 and 3) arranged for securely holding the tape in position. Each clamp consists of a leaf spring 74 having at the ends thereof oppositely directed slots 76 and 78. The slots are arranged to engage upstanding aligned pins 80 and 82 on opposite sides of the guide surface 28 for the tape.

Pivotally supported by the leaf spring 74 is a rigid metal bar 84 (FIG. 3), having on its bottom surface a felt contact pad 86 arranged to press against the tape. Securing the leaf spring and bar together is a stud 88 having a conical portion 90 engaging a complementary surface 92 in the metal bar.

To clamp the tape in place, the metal bar felt surface of a clamp is placed against the tape, with the leaf spring turned at an angle relative to the metal bar, perhaps aligned with the tape. Then, by pressing downwardly on opposite ends of the spring 74, the spring is deformed so that it can be turned and secured by heads on the aligned pins 80 and 82 on opposite sides of the tape.

In operation of the splicer, one end of the broken tape is placed in the splicer, either on the right or left side, with an edge of the tape placed against the splicer guide 20. The broken end is placed over and beyond the cutting area and is secured in place with the appropriate clamp. The procedure is repeated with the other broken end of the tape, making sure that both ends of the tape overlap.

After the magnetic tape is secured in place by the two clamps 70 and 72, with ends overlapping, the cutter arm 16 is positioned against the stop 68. It is pressed down against the spring 42 and held firmly against the tape while the cutter is drawn in the appropriate direction to the end of its stroke to cut the tape ends. This forms the ends of the tape so that in the clamped positions they are juxtaposed in abutting relationship.

The cutting arm then is raised and pivoted out of the way exposing the area where the tape has been cut. Excess tape is removed, and an adhesive splicing strip is pressed over the abutting ends completing the joint.

It will be apparent that the splicer holds the tape ends throughout the cutting and splicing steps so that the splicing operation is completed without moving the tape. By initially aligning the tape ends, one is assured that the tape is spliced evenly free of uneven edges which will catch in a machine. In addition, it should be evident that the splicing operation is accomplished in a rapid facile manner.

Although the invention has been described with reference to a presently preferred form thereof, modifications within the spirit and scope of the following claims will be apparent to those skilled in the art.

What is claimed is:

1. A mechanism for splicing tape ends comprising in combination:
   a base having an aupper surface,
   an elongated straight guide arranged to receive tape ends, the guide extending across said upper surface of the base and being interrupted at a point intermediate the ends thereof,
   means positioned on opposite sides of said intermediate point to clamp tape ends,
   an elongated cutting arm including means to support the arm pivotally on said base,
   a knife edge supported by said cutting arm arranged for movement along the cutting arm,
   means on said base positioning the cutting arm adjacent said intermediate point so that said knife edge follows a predetermined path at said intermediate point from one longitudinal edge of a tape to the other,
   a single piece of material embeded in said base along said predetermined path softer than said knife edge and into which said knife end extends, said cutting arm being positioned such that the knife edge extends into the embedded single piece of material during cutting of the tape.

2. A mechanism for splicing tape ends comprising in combination:
   a base having an upper surface,
   an elongated straight guide arranged to receive tape ends, the guide extending across said upper surface of the base and being interrupted at a point intermediate the ends thereof,
   means positioned on opposite sides of said intermediate point to clamp tape ends,
   an elongated cutting arm including means to support the arm pivotally on said base,
   a knife edge supported by said cutting arm arranged for movement along the cutting arm,
   a pivot shaft extending upright from the base upper surface, said cutting arm being pivoted at one end and about said shaft, a spring on said shaft biasing said cutting arm upwardly, and
   means on the base upper surface for releasably enggaging the arm other end, said pivot shaft and arm engaging means being arranged to hold the arm so that the knife edge follows said predetermined path in a plane approximately parallel to the base upper surface, and whereby, when the cutting arm is released by the arm engaging means, the knife edge is urged upward from the upper base surface by said spring and the arm can be pivoted out of the way.

3. A tape splicing mechanism comprising in combination:
   a base having an upper surface,
   guide means extending obliquely across said upper surface being interrupted at a point intermediate the ends thereof forming at said intermediate point a cutting area, said guide means including parallel spaced apart ridges extending from said intermediate point to opposite sides of the base and having a height greater than a tape,
   the surface between said parallel ridges being flat to receive a tape,
   means positioned lengthwise of said guide means on opposite sides of said intermediate point to clamp tape ends,
   an elongated cutting arm having a slot extending along the arm, pivot means extending upwardly from said base on which one end of said arm pivots, spring means urging said arm upwardly adjacent the upper end of said pivot means, a slider engaged by said arm slot for movement along the arm the surface of the arm slot engaging the slider being lined with polytetrafluoroethylene to facilitate movement of the slider, a knife having an inclined cutting edge secured to a face of said slider whereby the knife is held in an upright position relative to the tape receiving surface, means on said base for releasably engaging the other end of said arm removed from said pivot means, said pivot means, arm and engaging means being arranged whereby said knife cutting edge follows a predetermined path at said guide intermediate point from one longitudinal edge of a tape to the other, and a material embedded in said base along said predetermined path softer than said knife edge, said knife further being adapted whereby a portion thereof extends into said embedded material when the knife follows said predetermined path.

References Cited by the Examiner
UNITED STATES PATENTS

| | | | |
|---|---|---|---|
| 162,841 | 5/1875 | Mayer | 83—614 |
| 467,414 | 1/1892 | Hughs | 83—581 |
| 840,928 | 1/1907 | Gamston et al. | 83—614 |
| 1,122,050 | 12/1914 | Williams | 83—582 |
| 2,724,436 | 11/1955 | Constantine | 83—926 |

ANDREW R. JUHASZ, *Primary Examiner.*

WILLIAM W. DYER, JR., *Examiner.*

L. TAYLOR, *Assistant Examiner.*